United States Patent [19]

Kawashita et al.

[11] Patent Number: 4,732,615
[45] Date of Patent: Mar. 22, 1988

[54] COPPER PHTHALOCYANINE COMPOUND AND AQUEOUS INK COMPOSITION COMPRISING THE SAME

[75] Inventors: Hideo Kawashita, Ibaraki; Mitsuhiro Ota, Toyonaka, both of Japan

[73] Assignees: Taoka Chemical Co., Ltd.; Sumitomo Chemical Co., Ltd., both of Osaka, Japan

[21] Appl. No.: 844,587

[22] Filed: Mar. 27, 1986

[30] Foreign Application Priority Data

Mar. 29, 1985 [JP] Japan .................................. 60-68258
Sep. 9, 1985 [JP] Japan ................................ 60-200381

[51] Int. Cl.$^4$ ............................................ C09D 11/02
[52] U.S. Cl. ...................................... 106/22; 106/23; 106/20
[58] Field of Search ................. 106/22, 23, 308 Q, 20; 540/132

[56] References Cited

U.S. PATENT DOCUMENTS 4,632,703 12/1986 Koike et al. ........................... 106/23

Primary Examiner—Amelia Burgess Yarbrough
Attorney, Agent, or Firm—Wegner & Bretschneider

[57] ABSTRACT

A copper phthalocyanine compound of the formula:

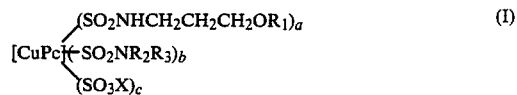

wherein CuPc is a copper phthalocyanine nucleus, $R_1$ is an alkyl group, an aralkyl group or an aryl group each having 3 to 18 carbon atoms, $R_2$ and $R_3$ are, the same or different, each a hydrogen atom or a hydroxyethyl group, X is an alkali metal, a hydrogen atom or an ammonium group, a is 1 or 2, b is 0, 1 or 2 and c is 1, 2 or 3 provided that a, b and c satisfy following equation:

$$2 \leq a+b+c \leq 4,$$

which is useful as a cyanic dyestuff for an aqueous ink composition, particularly for ink jet recording.

7 Claims, No Drawings

COPPER PHTHALOCYANINE COMPOUND AND AQUEOUS INK COMPOSITION COMPRISING THE SAME

FIELD OF THE INVENTION

The present invention relates to a copper phthalocyanine compound and an aqueous ink composition comprising the same suitable for printing, writing, recording, stamping, etc. More particularly, it relates to an aqueous ink composition for ink jet recording, which can provide an excellent water-resistant cyanic image without causing any clogging in an nozzle even when used intermittently over a long period of time.

BACKGROUND OF THE INVENTION

In general, conventional aqueous ink compositions basically comprise a dyestuff, a polyhydric alcohol or its corresponding ether as a wetting agent and water. In order to achieve good ink jet recording, these conventional ink compositions are required to have various properties. They should have appropriate values in viscosity, surface tension, specific electric conductivity, density and the like. These properties allow adequate droplet formation and control of the jetting directions of the droplets. Further, they should not form any precipitation during storage, in use or at rest over a long period of time. Furthermore, they should not suffer from any significant variation in the physical properties.

An outlet of a nozzle for a recording device has, in general, a diameter of 10 to 60 microns, and any precipitation within the nozzle disturbs ejection of the aqueous droplets of ink from the nozzle. Even if the nozzle is not completely clogged, it is likely to produce solid or viscous material around the outlet of the nozzle, which leads to the depression of the physical property of the ink composition so designed to have that property within a desired range, whereby deterioration of the recording ability as well as the stability or response in jetting will be caused. Still, the printed image as recorded must have not only sufficiently high contrast and clarity but also water resistance, light resistance and the like.

As a cyanic dyestuff (a kind of a blue dyestuff) for the aqueous ink composition, conventionally employed are water soluble direct dyes and acid dyes. Examples of such cyanic dyestuff are C.I. Direct Blue 1, 8, 71, 76, 78, 108, 163, 195, 202 and 236 and C.I. Acid Blue 1, 7, 126, 175 and 234 (cf. Japanese Patent Kokai Publication (unexamined) Nos. 145771/1980, 5772/1982 and 141257/1983).

Since the conventional direct dyes have, however, disadvantages such that they have low solubility in water, sufficient image concentration and contrast are not expected to a satisfactory degree, and they agglomerate and precipitate during storage or in use over a long period of time and are apt to produce the clogging in the nozzle. In addition, they produce a printed image with insufficient water resistance. To overcome these drawbacks as seen in the conventional cyanic dyestuffs, it has been proposed to incorporate in the aqueous composition an additive such as an organic amine or a surfactant as a solubilizer. However, such additive corrodes various parts of the recording device and may invite cloggings in the nozzle due to bubbling of ink composition, whereby the printed image is not sufficiently clear.

On the other hand, the use of the conventional acid dyes may enhance the color tone but produces only an printed image with insufficient qualities, particularly poor water resistance. Therefore, it is necessary to use a special paper for recording as in the case of the direct dyes.

SUMMARY OF THE INVENTION

One object of the present invention is to provide a novel copper phthalocyanine compound which is useful as a cyanic dyestuff suitable for use in an aqueous ink composition, particularly for ink jet recording.

Another object of the present invention is to provide an aqueous ink composition comprising a cyanic dyestuff which has good storage stability and causes no clogging of nozzle of an ink jet recording device because of proper solubility of the dyestuff in water.

A further object of the present invention is to provide an aqueous ink composition comprising a cyanic dyestuff which provides an excellent cyanic image having water and light resistances.

These and other objects are accomplished by a copper phthalocyanine compound of the formula:

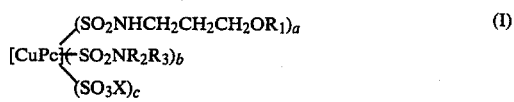

wherein CuPc is a copper phthalocyanine nucleus, $R_1$ is an alkyl group, an aralkyl group or an aryl group each having 3 to 18 carbon atoms, $R_2$ and $R_3$ are, the same or different, each a hydrogen atom or a hydroxyethyl group, X is an alkali metal, a hydrogen atom or an ammonium group, a is 1 or 2, b is 0, 1 or 2 and c is 1, 2 or 3 provided that a, b and c satisfy following equation:

$$2 \leq a+b+c \leq 4,$$

and an aqueous ink composition comprising the copper phthalocyanine compound (I), a wetting agent and water.

DETAILED DESCRIPTION OF THE INVENTION

Specific examples of the alkoxypropylamino group of the formula:

wherein $R_1$ is the same as defined above contained in the copper phthalocyanine compound (I) are propoxypropylamino, butoxypropylamino, hexyloxypropylamino, 2-ethylhexyloxypropylamino, lauryloxypropylamino, stearyloxypropylamino and the like. Specific examples of the amino group of the formula:

wherein $R_2$ and $R_3$ are the same as defined above are amino, ethanolamino and diethanolamino. Specific examples of alkali metal represented by the residue X in the formula (I) are sodium, potassium and lithium.

When the group $R_1$ has less than 3 carbon atoms, a copper phthalocyanine compound has a too large solubility in water and is inferior in affinity to the wetting agent. Therefore, it causes clogging of the nozzle, and the water resistance of the recorded image is deteriorated. When the group $R_1$ has more than 18 carbon atoms, a copper phthalocyanine compound is inferior in affinity to the wetting agent and water so that a larger amount of the wetting agent is required to prepare the ink composition. Yet, the image density is not increased, and almost all the properties such as storage stability and an anti-nozzle clogging property are not satisfactory.

In the compound of the formula (I), "a" should be 1 or 2 to increase affinity of the compound to the wetting agent and water resistance of the recorded image. "b" may be 0 (zero) although the copper phthalocyanine compound (I) wherein "b" is 1 or 2 has better affinity to glycols and the like. When "c" is 0 (zero), the compound (I) has poor affinity to water. In order to compromise the affinity of the compound (I) to the wetting agent as well as water and water resistance of the recorded image, "a", "b" and "c" should satisfy the equation: $2 \leq a+b+c \leq 4$.

The copper phthalocyanine compound (I) may be prepared, for example, by chlorosulfonating copper phthalocyanine with thionyl chloride at a temperature of 60° to 110° C. after heating copper phthalocyanine in chlorosulfonic acid at a temperature of 110° to 145° C., and dispersing the chlorosulfonated compound in cold water. Then, a required amount of an organic amine and optionally ammonia are added to the aqueous mixture. Finally, hydroxide or carbonate of alkali metal is added and reacted in an alkaline pH range.

The wetting agent may be one conventionally used for an aqueous ink composition. Examples of such wetting agent are polyhydric alcohols, cellosolves, carbitols, and the like. Specifically, there are exemplified ethylene glycol, diethylene glycol, triethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monethyl ether and the like. In addition, any solubilizer for dyestuff as conventionally employed may be used. Examples of the solubilizer are dimethylformamide, pyrrolidone, alcohols, alkanolamines, and the like.

In the ink composition of the invention, the amount of the copper phthalocyanine compound (I) is usually from 0.5 to 20 parts by weight, preferably from 1 to 15 parts by weight per 100 parts by weight of the whole ink composition.

Usually, the copper phthalocyanine compound (I) develops cyanic color, and may be used alone or in combination. In addition, any dyestuff used in a conventional aqueous ink composition may be incorporated in the ink composition of the invention in such amount that the characteristic properties of the copper phthalocyanine compound (I) are not deteriorated.

The wetting agent is used in an appropriate amount so as to impart the characteristic properties desired for a recording vehicle of the ink composition. Its amount may be preferably from 10 to 80 parts by weight per 100 parts by weight of the ink composition. Usually, one kind of the wetting agent is used, although two or more kinds of them may be used insofar as they do not adversely affect each other.

In order to provide the ink composition of the invention with additional characteristic properties, at least one other conventional additive may be incorporated in the composition. Specific examples of such additives are antiseptics or fungicides (e.g. sodium dehydroacetate, 2,2-dimethyl-6-acetoxydioxane, ammonium thioglycollate, etc.), rust preventives (e.g. acid sulfites, sodium thiosulfate, dicyclohexylammonium nitrite, etc.), UV light absorbers, viscosity regulators, surfactants, pH adjusters, specific resistance adjusters, IR light absorbers and the like.

Unlike the conventional cyanic dyestuffs, the copper phthalocyanine compound (I) of the invention is characteristic in that, on one hand, it has comparatively poor solubility in water and, on the other hand, it has improved affinity to polyhydric alcohols, cellosolves and carbitols. Therefore, it can be used in a variety of aqueous ink compositions and preserve a solution state with a high stability against the variation of the composition caused during the storage and/or the use. In addition, the copper phthalocyanine compound (I) is easily isolated with high purity from the by-produced inorganic materials so that the image recorded by the copper phthalocyanine compound (I) has high density and clarity.

The aqueous ink composition of the invention is suitable for printing, writing, recording, stamping, ink jet recording, coating, and coloring a molded article and a film made of a synthetic resin.

The present invention will be hereinafter explained further in detail by following examples in which part(s) are by weight unless otherwise indicated.

EXAMPLE 1

In chlorosulfonic acid (500 g), copper phthalocyanine (100 g) was charged, heated at a temperature of 140°-145° C. for 3 hours and then cooled to 70° C. To the mixture, thionyl chloride (78 g) was added and heated at a temperature of 90°-95° C. for 3 hours. The mixture containing the chlorosulfonated compound cooled to 30° C. was poured in ice water (3 l) in a thin stream. After filtration, the cake was dispersed in water (2 l) cooled at 5° C. Then, 2-ethylhexyloxypropylamine (32 g) and monoethanolamine (10 g) were added followed by the addition of sodium hydroxide to adjust pH at 9-10. The mixture was reacted overnight with stirring and then kept at 60° C. for 1 hour. After filtration, the product was washed with water (3 l) and dried to give a blue powdery compound (155 g) having the following formula. A solution of this compound in methanol had $\lambda_{max}$ at 665 nm and absorbance of 0.594 (5 mg/l).

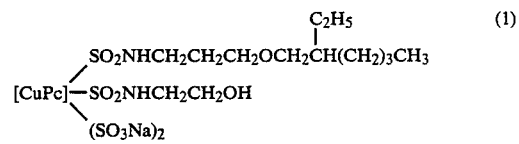

EXAMPLE 2

In the same manner as in Example 1 but using isobutoxypropylamine in place of 2-ethylhexyloxypropylamine, the reactions were carried out to give a blue powdery compound (140 g) of the following formula.

A solution of this compound in methanol had $\lambda_{max}$ at 665 nm and absorbance of 0.613 (5 mg/l).

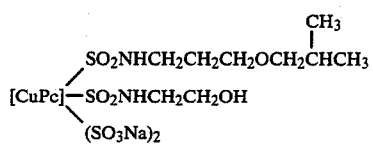

EXAMPLE 3

In chlorosulfonic acid (500 g), copper phthalocyanine (100 g) was charged, heated at a temperature of 115°–120° C. for 3 hours and then cooled to 70° C. To the mixture, thionyl chloride (50 g) was added and heated at a temperature of 90°–95° C. for 3 hours. The mixture containing the chlorosulfonated compound cooled to 30° C. was poured in ice water (3 l) in a thin stream. After filtration, the cake was dispersed in water (2 l) cooled at 5° C. Then, lauryloxypropylamine (42 g) was added followed by the addition of lithium hydroxide to adjust pH at 9–10. The mixture was reacted overnight with stirring and then kept at 60° C. for 1 hour. After filtration, the product was washed with water (3 l) and dried to give a blue powdery compound (135 g) having the following formula. A solution of this compound in methanol had $\lambda_{max}$ at 667 nm and absorbance of 0.715 (5 mg/l).

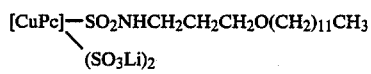

EXAMPLE 4

In chlorosulfonic acid (500 g), copper phthalocyanine (100 g) was charged, heated at a temperature of 140°–145° C. for 3 hours and then cooled to 70° C. To the mixture, thionyl chloride (78 g) was added and heated at a temperature of 90°–95° C. for 3 hours. The mixture containing the chlorosulfonated compound cooled to 30° C. was poured in ice water (3 l) in a thin stream. After filtration, the cake was dispersed in water (2 l) cooled at 5° C. Then, nonyloxypropylamine (34.9 g) and 28% ammonia (11 g) were added followed by the addition of sodium ash to adjust pH at 9–10. The mixture was reacted overnight with stirring and then kept at 60° C. for 1 hour. After filtration, the product was washed with water (3 l) and dried to give a blue powdery compound (153 g) having the following formula. A solution of this compound in methanol had $\lambda_{max}$ at 665 nm and absorbance of 0.610 (5 mg/l).

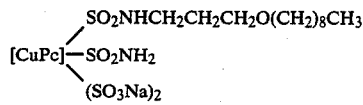

EXAMPLE 5

In chlorosulfonic acid (500 g), copper phthalocyanine (100 g) was charged, heated at a temperature of 140°–145° C. for 3 hours and then cooled to 70° C. To the mixture, thionyl chloride (78 g) was added and heated at a temperature of 90°–95° C. for 3 hours. The mixture containing the chlorosulfonated compound was poured in ice water (3 l) in a thin stream. After filtration, the cake was dispersed in water (2 l) cooled at 5° C. Then, 2-ethylhexyloxypropylamine (32 g) was added followed by the addition of sodium hydroxide to adjust pH at 9–10. The mixture was reacted overnight with stirring and then kept at 60° C. for 1 hour. After filtration, the product was washed with water (3 l) and dried to give a blue powdery compound (152 g) having the following formula. A solution of this compound in methanol had $\lambda_{max}$ at 665 nm and absorbance of 0.598 (5 mg/l).

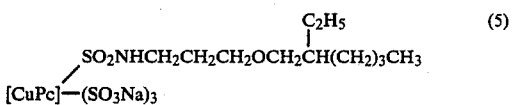

EXAMPLE 6

In the same manner as in Examples 1 to 5, compounds (6) to (25) as shown in Table 1 were prepared.

For comparison, dyestuffs (A) to (C) as shown in Table 2 were used.

TABLE 1

| Compound No. | a | b | c | $R_1$ | $R_2$ | $R_3$ | X | $\lambda_{max}$ | Absorbance (5 mg/l) |
|---|---|---|---|---|---|---|---|---|---|
| 6 | 1 | 1 | 1 | $C_6H_{13}$ | H | H | Na | 667 | 0.731 |
| 7 | 1 | 1 | 1 | $CH_2CH(CH_2)_3CH_3$ $\mid$ $CH_2CH_3$ | H | $CH_2CH_2OH$ | Na | 667 | 0.723 |
| 8 | 1 | 1 | 1 | $C_{12}H_{25}$ | $CH_2CH_2OH$ | $CH_2CH_2OH$ | K | 667 | 0.610 |
| 9 | 2 | 1 | 1 | $C_3H_7$ | H | H | $NH_4$ | 665 | 0.760 |
| 10 | 2 | 1 | 1 | $C_4H_9$ | H | $CH_2CH_2OH$ | Na | 665 | 0.753 |
| 11 | 2 | 1 | 1 | $C_5H_{11}$ | $CH_2CH_2OH$ | $CH_2CH_2OH$ | Na | 665 | 0.740 |
| 12 | 1 | 2 | 1 | $C_4H_9$ | H | H | Na | 665 | 0.745 |
| 13 | 1 | 2 | 1 | 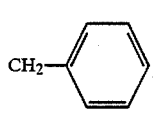 | H | $CH_2CH_2OH$ | K | 665 | 0.725 |
| 14 | 1 | 2 | 1 | $C_6H_{13}$ | $CH_2CH_2OH$ | $CH_2CH_2OH$ | K | 665 | 0.720 |
| 15 | 1 | 1 | 2 | $C_{12}H_{25}$ | H | H | $NH_4$ | 665 | 0.660 |
| 16 | 1 | 1 | 2 | $C_{18}H_{37}$ | $CH_2CH_2OH$ | $CH_2CH_2OH$ | Li | 665 | 0.590 |

TABLE 1-continued

| Compound No. | a | b | c | $R_1$ | $R_2$ | $R_3$ | X | $\lambda_{max}$ | Absorbance (5 mg/l) |
| --- | --- | --- | --- | --- | --- | --- | --- | --- | --- |
| 17 | 1 | 0 | 2 | 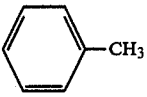 | — | — | Li | 667 | 0.710 |
| 18 | 1 | 0 | 2 | $C_{16}H_{33}$ | — | — | Na | 667 | 0.706 |
| 19 | 1 | 0 | 2 | $C_{18}H_{37}$ | — | — | Na | 667 | 0.700 |
| 20 | 2 | 0 | 1 | $C_4H_9$ | — | — | K | 667 | 0.782 |
| 21 | 2 | 0 | 1 | $C_6H_{13}$ | — | — | K | 667 | 0.745 |
| 22 | 2 | 0 | 2 | $CH_2CH(CH_2)_3CH_3$ \| $CH_2CH_3$ | — | — | Na | 665 | 0.738 |
| 23 | 2 | 0 | 2 | $CH_2CH(CH_2)_3CH_3$ \| $CH_2CH_3$ | — | — | K | 665 | 0.736 |
| 24 | 1 | 0 | 3 | $C_{12}H_{25}$ | — | — | Na | 665 | 0.650 |
| 25 | 2 | 0 | 2 | $C_{12}H_{25}$ | — | — | Li | 665 | 0.620 |

TABLE 2

| Compound No. | a | b | c | $R_1$ | $R_2$ | $R_3$ | X |
| --- | --- | --- | --- | --- | --- | --- | --- |
| A | 0 | 0 | 3 | — | — | — | K |
| B | 0 | 2 | 2 | — | H | $CH_2CH_2OH$ | Na |
| C | 3 | 0 | 0 | $C_4H_9$ | — | — | — |

EXAMPLES 7 TO 18 AND COMPARATIVE EXAMPLES 1 TO 3

Components shown in Table 3 were thoroughly mixed. The resultant mixture was sufficiently stirred at 50° C. and filtered under pressure by means of a membrane filter (0.5 micron) to obtain an ink composition for recording, of which storage stability, jet stability, image clarity and water resistance were examined. The examinations were carried out as follows:

STORAGE STABILITY

The ink composition was sealed in a Pyrex-made test tube and allowed to stand at 0° C. or 50° C. for one month. Thereafter, degree of precipitation was observed, and evaluated according to the following criteria:
⊚ : No precipitation
○: Scarce precipitation
Δ: A little precipitation
X: Much precipitation

JET STABILITY

The ink composition was charged in an ink jet recording device provided with a nozzle of 30 microns in diameter and jetted for 24 hours, during which jetting was effected with cycles each consisting of one second jetting and one second rest. After the jetting was stopped, the ink composition was allowed to stand at room temperature for 10, 20, 30, 60 or 90 days and again subjected to jetting, at which observation was made on whether clogging was produced. The jet stability was represented by the maximum number of days after which re-jetting could be carried out without clogging.

IMAGE CLARITY

The ink composition was jetted for recording by the means of the same device as used for evaluating the jet stability, and the image clarity on the recording was visually observed and evaluated according to the following criteria:
⊚: Excellent
○: Normal
Δ: Not sufficient
X: Poor

WATER RESISTANCE

An image was recorded on a sheet of wood-free paper and immersed in water for one minute. Then, a degree of bleeding of the dye was visually observed and evaluated according to the following criteria:
⊚: No bleeding
○: Slight bleeding
Δ: Bleeding
X: Heavy bleeding As understood from the results in Table 3, it is clear that the ink composition of the invention gives an enhanced cyanic image, can be stably stored over a longer period of time and is improved in nozzle clogging in comparison with the conventional ink composition.

The ink composition of the present invention was filled in a ball-point pen or a marking pen as the aqueous ink for writing, and stability on standing and water resistance of written image were examined as follows:

STABILITY ON STANDING

The ball-point pen or the marker pen filled with the ink composition of Examples 7 to 18 or Comparative Examples 1 to 3 was horizontally placed on a table at a room temperature for 6 or 9 months. Then, an image was written on a sheet of writing paper A according to JIS (Japanese Industrial Standards) P3201, and the condition of the written image was observed and evaluated according to following criteria:
○: Good condition
Δ: Blurred.

WATER RESISTANCE

With the ball-point pen or the marker pen filled with the ink composition of Examples 7 to 18 or Comparative Examples 1 to 3, an image was written on a sheet of the same paper as used in the above stability test. After 30 seconds, the paper was immersed in water for 1 hour. The condition of the image was observed and evaluated according to following criteria:

X: Bleeding or decrease of color density
o: No change.

The results are also shown in Table 4.

As understood from the results, the aqueous ink composition of the present invention maintains stability for a longer period of time and provides an image with better water stability.

TABLE 3

| Example No. | 7 | 8 | 9 | 10 | 11 | 12 | 13 | 14 | 15 | 16 | 17 | 18 | Comp. 1 | Comp. 2 | Comp. 3 |
|---|---|---|---|---|---|---|---|---|---|---|---|---|---|---|---|
| Azo compound No. | 1 | 2 | 3 | 4 | 5 | 7 | 10 | 12 | 15 | 22 | 23 | 24 | A | B | C |
| (parts) | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Ethylene glycol | | | 10 | | | | | 20 | 28 | | | 10 | | 15 | 15 |
| Diethylene glycol | | 22 | | | 5 | | 28 | | | | 10 | | | 5 | 5 |
| Polyethylene glycol #200 | 18 | 10 | 15 | 15 | 15 | 15 | 5 | 15 | 15 | 20 | 5 | 20 | 18 | 20 | 20 |
| Glycerol | | | | 3 | | | | | 5 | | 3 | | | | |
| Methylcellosolve | | | | | | | | | | | | 8 | | | |
| Propylene glycol | | | 3 | | | | | 28 | | | | | | 8 | 8 |
| Butyl carbitol | 10 | | | | 10 | 8 | 10 | | | 8 | 20 | 20 | | | |
| N—Methyl-2-pyrolidone | | 5 | | | 8 | | | | | | | | | | |
| Triethenolamine | 2 | 2 | 2 | 2 | 2 | 2 | 2 | 2 | 2 | 2 | 2 | 2 | 2 | 2 | 2 |
| Ion exchanged water | 66.5 | 56.5 | 66.5 | 76.5 | 56.5 | 76.5 | 51.5 | 31.5 | 46.5 | 66.5 | 56.3 | 36.5 | 76.5 | 46.5 | 46.5 |
| Storage stability | | | | | | | | | | | | | | | |
| At 0° C. | o | ◎ | o | ◎ | ◎ | ◎ | ◎ | ◎ | o | ◎ | ◎ | ◎ | o | o | Δ |
| At 50° C. | ◎ | ◎ | ◎ | ◎ | o | ◎ | ◎ | ◎ | ◎ | ◎ | ◎ | ◎ | Δ | o | Δ |
| Jetting stability (days) | 90 | 90 | 90 | 90 | 90 | 90 | 90 | 90 | 90 | 90 | 90 | 90 | 20 | 30 | 20 |
| Image clarity | ◎ | ◎ | ◎ | ◎ | ◎ | ◎ | ◎ | ◎ | ◎ | ◎ | ◎ | ◎ | o | ◎ | o |
| Color tone | blue | blue | blue | blue | blue | blue | blue | blue | blue | blue | blue | blue | blue | blue | blue |
| Water resistance | o | o | o | o | o | o | o | o | o | o | o | o | X | X | o |

TABLE 4

| Example No. | 7 | 8 | 9 | 10 | 11 | 12 | 13 | 14 | 15 | 16 | 17 | 18 | Comp. 1 | Comp. 2 | Comp. 3 |
|---|---|---|---|---|---|---|---|---|---|---|---|---|---|---|---|
| Azo compound No. | 1 | 2 | 3 | 4 | 5 | 7 | 10 | 12 | 15 | 22 | 23 | 24 | A | B | C |
| (parts) | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Ethylene glycol | | | 10 | | | | | 20 | 28 | | | 10 | | 15 | 15 |
| Diethylene glycol | | 22 | | | 5 | | 28 | | | | 10 | | | 5 | 5 |
| Polyethylene glycol #200 | 18 | 10 | 15 | 15 | 15 | 15 | 5 | 15 | 15 | 20 | 5 | 20 | 18 | 20 | 20 |
| Glycerol | | | | 3 | | | | | 5 | | 3 | | | | |
| Methylcellosolve | | | | | | | | | | | | 8 | | | |
| Propylene glycol | | | 3 | | | | | 28 | | | | | | 8 | 8 |
| Butyl carbitol | 10 | | | | 10 | 8 | 10 | | | 8 | 20 | 20 | | | |
| N—methyl-2-pyrolidone | | 5 | | | 8 | | | | | | | | | | |
| Triethenolamine | 2 | 2 | 2 | 2 | 2 | 2 | 2 | 2 | 2 | 2 | 2 | 2 | 2 | 2 | 2 |
| Ion exchanged water | 66.5 | 56.5 | 66.5 | 76.5 | 56.5 | 76.5 | 51.5 | 31.5 | 46.5 | 66.5 | 56.5 | 36.5 | 76.5 | 46.5 | 46.5 |
| Stability on standing | | | | | | | | | | | | | | | |
| 6 months | o | o | o | o | o | o | o | o | o | o | o | o | o | o | Δ |
| 9 months | o | o | o | o | o | o | o | o | o | o | o | o | Δ | o | Δ |
| Water resistance | o | o | o | o | o | o | o | o | o | o | o | o | X | X | o |
| Kind of pen*[1] | 1 | 1 | 1 | 1 | 1 | 1 | 2 | 2 | 2 | 2 | 2 | 2 | 1 | 1 | 1 |

Note
*[1] 1: a marker pen, 2: a ball point pen.

What is claimed is:

1. An aqueous ink composition comprising a copper phthalocyanine compound of the formula:

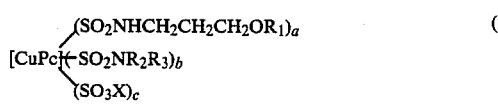

(I)

wherein CuPc is a copper phthalocyanine nucleus, $R_1$ is an alkyl group, an aralkyl group or an aryl group each having 3 to 18 carbon atoms, $R_2$ and $R_3$ are, the same or different, each a hydrogen atom or a hydroxyethyl group, X is an alkali metal, a hydrogen atom or an ammonium group, a is 1 or 2, b is 0, 1 or 2 and c is 1, 2 or 3 provided that a, b and c satisfy following equation:

$$2 \leq a+b+c \leq 4,$$

a wetting agent and water.

2. The aqueous ink composition according to claim 1, wherein, in the formula (I), a is 1 (one), b is 0 (zero) and c is 3, $R_1$ is a 2-ethylhexyl group, and X is an alkali metal.

3. The aqueous ink composition according to claim 1, wherein, in the formula (I), a is 1 (one), b is 1 (one) and c is 2, $R_1$ is a 2-ethylhexyl group, $R_2$ is a hydrogen atom, $R_3$ is a hydroxylethyl group, and X is an alkali metal.

4. The aqueous ink composition according to claim 1, which comprises 1 to 15 parts by weight of the copper phthalocyanine of the formula (I) per 100 parts by weight of the composition.

5. The aqueous ink composition according to claim 1, which comprises 10 to 80 parts by weight of the wetting agent per 100 parts by weight of the composition.

6. The aqueous ink composition according to claim 1, wherein the wetting agent is at least one selected from the group consisting of polyhydric alcohols, cellosolves and carbitols.

7. The aqueous ink composition according to claim 1, which is an ink composition for ink jet recording.

* * * * *